April 10, 1951   F. A. JENKS   2,547,945
SYSTEM FOR CONVEYING TRAFFIC DATA TO AIRCRAFT
Filed Jan. 29, 1944   3 Sheets-Sheet 1

(GROUND STATION)

INVENTOR
FREDERIC A. JENKS
BY
his ATTORNEY.

April 10, 1951 F. A. JENKS 2,547,945
SYSTEM FOR CONVEYING TRAFFIC DATA TO AIRCRAFT
Filed Jan. 29, 1944 3 Sheets-Sheet 2

(MOBILE STATION)

INVENTOR
FREDERIC A. JENKS
BY
ATTORNEY

April 10, 1951  F. A. JENKS  2,547,945
SYSTEM FOR CONVEYING TRAFFIC DATA TO AIRCRAFT
Filed Jan. 29, 1944  3 Sheets-Sheet 3

INVENTOR
FREDERIC A. JENKS
BY
Herbert R. Thompson
his ATTORNEY.

Patented Apr. 10, 1951

2,547,945

UNITED STATES PATENT OFFICE 2,547,945

SYSTEM FOR CONVEYING TRAFFIC DATA TO AIRCRAFT

Frederic A. Jenks, Rockville Centre, N. Y., assignor to The Sperry Corporation, a corporation of Delaware Application January 29, 1944, Serial No. 520,177

16 Claims. (Cl. 343—6)

The present invention relates, generally to object detecting and locating radio systems, and more particularly, to obstacle indication and automatic direction finding on mobile craft.

It has been contemplated in the prior art to install radio location apparatus employing scanning radiant beams on dirigible craft as navigational aids and obstacle detectors. This approach to the problem of collision prevention suffers from the disadvantages arising from the necessity for carrying radio transmitting equipment on each craft. Mechanically rotating or oscillating radiators and microwave pulse transmitting apparatus strain the power, weight, and space capacities of aircraft and create radio interference for neighboring craft. This type of apparatus provides protection over a field of view ordinarily limited, by the forward hemisphere and gives no warning of slowly converging or overtaking craft. Also the positional information is derived and indicated from the subjective viewpoint of the moving craft; consequently the usual navigational problem, that of determining the craft's position relative to a particular stationary object such as an airport, is not directly solved.

It is, therefore, one of the objects of the present invention to provide an obstacle avoidance and direction finding radio system wherein a single stationary radio object locator cooperates with a television transmitter at or near the locator to furnish a plurality of craft within the field of view of the locator with navigational and anti-collisional information.

Another object of the present invention lies in the provision of a multiple purpose radio system requiring no mobile transmitting equipment, yet which is adapted to supply a ground station with pictorial air traffic information while simultaneously furnishing aircraft in the neighborhood with navigation and obstacle avoidance data presented objectively from the point of view of the ground station.

A further object is to provide means operable by a traffic control officer for selectively signalling a particular craft on the cathode ray indicators of all craft within the jurisdiction of the officer, so that specific instructions may be transmitted to the designated craft over a radio channel common to all craft without causing confusion.

Yet another object of the present invention is to provide means whereby a plurality of craft can be furnished individual navigational information in turn from a single television transmitter at a repetition rate sufficiently rapid so that the information is substantially continuous.

A still further object lies in the provision in such a system of means for enabling an observer on a particular craft to determine his position by identifying on the indicator carried by the craft that image which has an orientation corresponding to the direction of the craft from the reference viewpoint.

Other objects will become apparent during the course of the following description and in the appended claims.

In the essential embodiment of the present invention a radio object detecting and locating system situated at a reference station or position such as an airport scans the surrounding area with a beam of radiant energy, receives reflections or reradiations from mobile craft and obstacles in the field of view, and determines the position of the reflecting or reradiating objects with respect to the reference station or position. Information defining the spatial relationships of the craft is broadcast to these same craft as for example over a television type of radio channel. Apparatus on each craft receives the television waves, reproduces the video signals corresponding to the reflections collected by the radio location system, and furnishes the signals to a cathode ray indicator which, in turn, presents a visual picture of the field of view as seen from the reference position. Each craft is also provided with means for distinguishing the image designating its own position from the remaining images of the picture, e. g. as by means responsive to the scanning radiant beam as it sweeps by. The pulse of energy received from the radiant beam during its passage across the craft may be employed to modify the cathode ray indication on the craft. This modification may conveniently take the form of either a momentary brightening or enlargement of the reproduced image effected by an intensification or a defocussing, respectively, of the electron beam. This action occurs substantially simultaneously with reproduction of the luminous spot corresponding to the craft being scanned by the radiant beam. Thus, the positional data of each craft is particularly characterized or distinguished on its own cathode ray picture. The radio system is further adapted to select by visual signals that craft with which the ground station wishes to communicate. In the particular embodiment of the invention illustrated, this selection is accomplished by luminously encircling that spot on all cathode ray pictures corresponding to the chosen craft. This selective visual signalling is employed with a single radio channel in a manner analogous to the use of selective ringing on multiple party telephone circuits. The selection in the present instance is, however, based on the position rather than on the identity of the party.

The features of the invention will become more apparent in connection with the following detailed description of the illustrated embodiment thereof, together with the accompanying drawings, wherein, Fig. 1A is a block diagram of the stationary transmitting apparatus of the present invention;

Figure 1A:
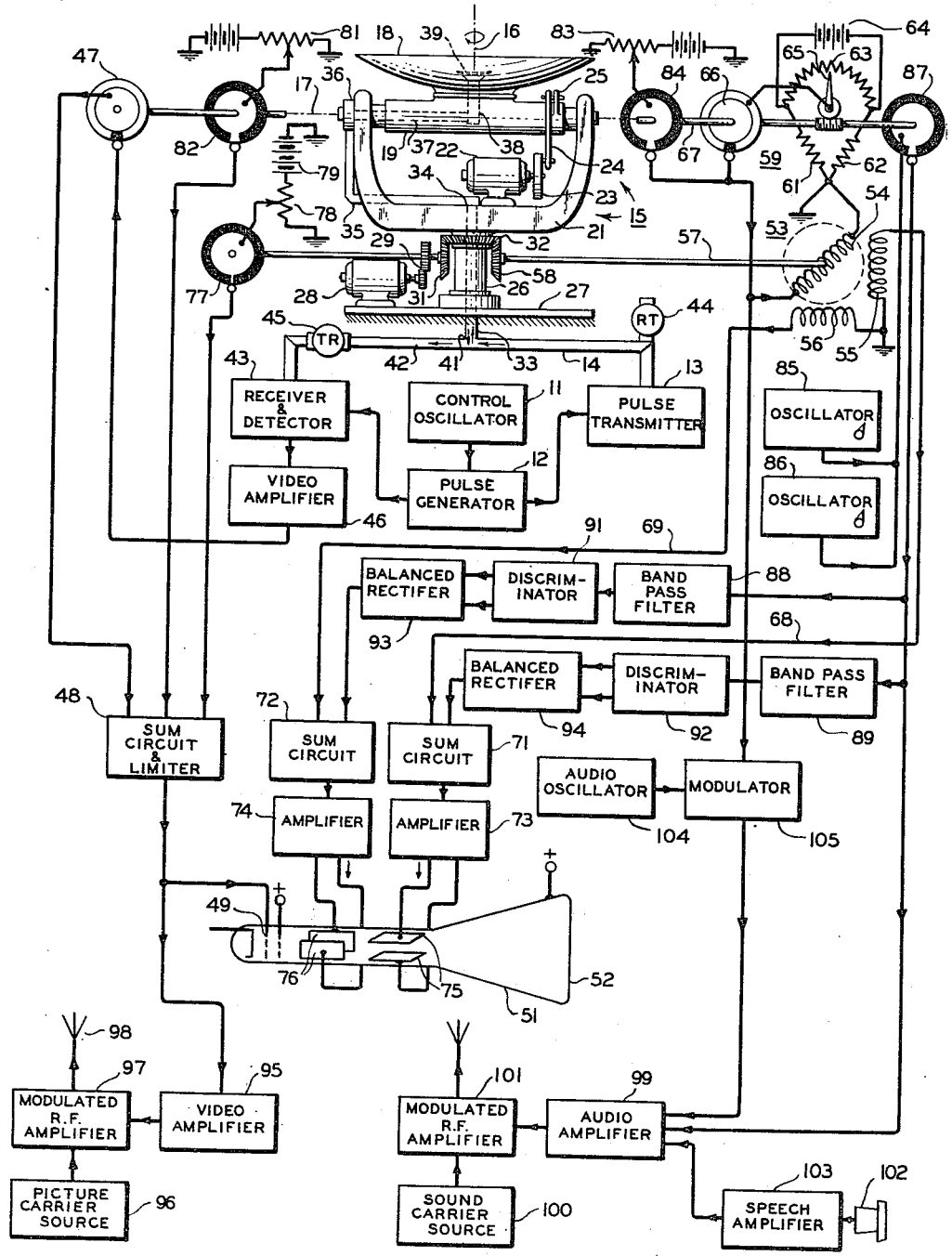
Fig. 1B is a block diagram of the mobile receiving apparatus which cooperates with the transmitting apparatus shown in Fig. 1A.
Figure 1B:
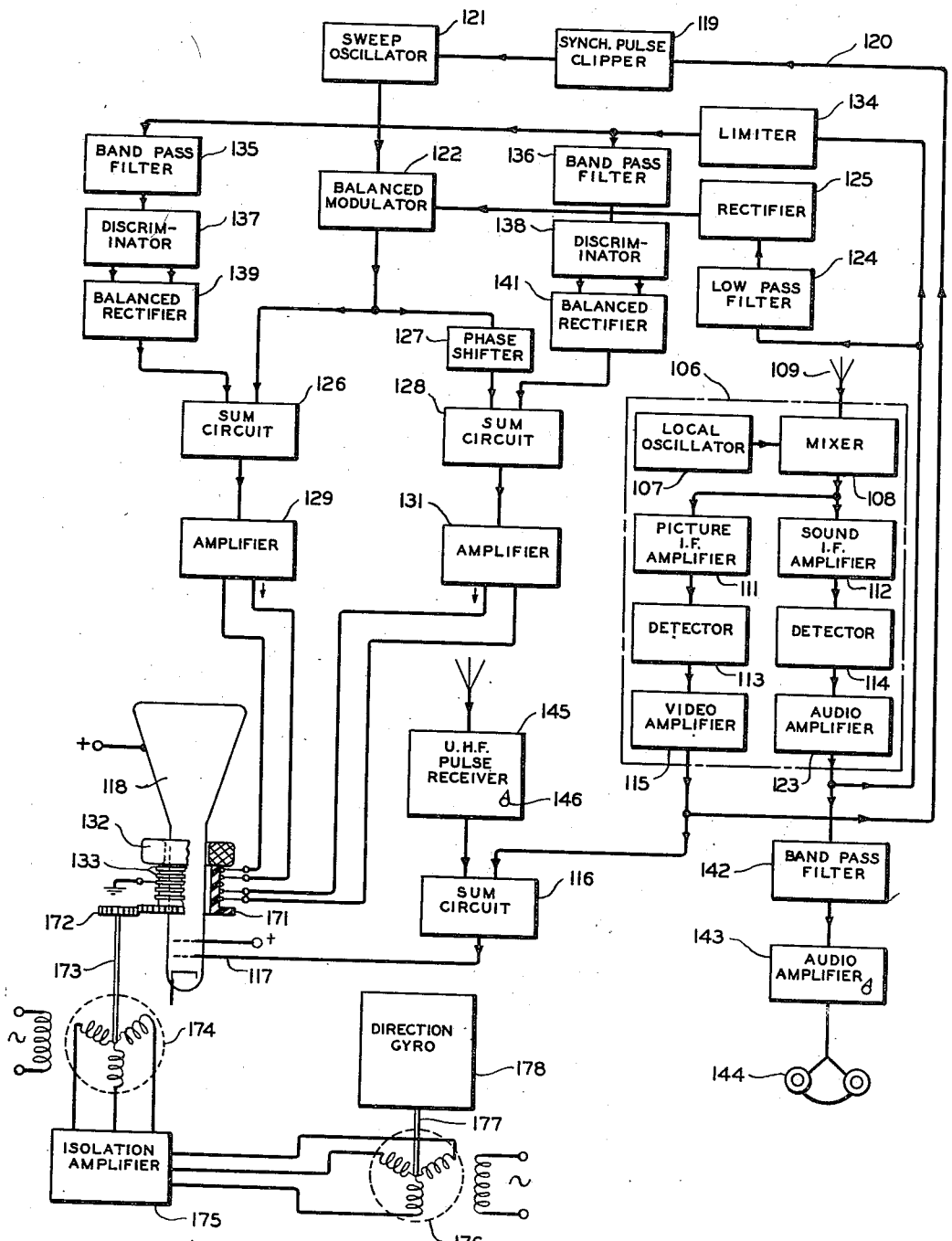

Arrows are employed in Figs. 1A and 1B to indicate the direction of control or energy flow.

Referring now to Fig. 1A, a control oscillator 11 provides a wave of suitable synchronizing and control frequency in the audio range. The output of oscillator 11 is connected to a pulse generator 12 which is adapted to convert the stable sinusoidal oscillations fed to it into suitable pulses of any desired shape, magnitude and duration, but having a repetition rate determined by the frequency of oscillator 11. Device 12 employs well known clipping, differentiating and other wave-shaping circuits in a conventional manner and is a well known component in radio location apparatus.

Trigger pulses are supplied from generator 12 to a pulse transmitter 13 for momentarily activating an ultra high frequency oscillator such as a magnetron. Transmitter 13 is caused to produce extremely short pulses of perhaps a microsecond duration which are fed through a rectangular wave guide 14 to a scanning radiator 15.

The radiator 15 is adapted to scan a desired conical angle as great as a hemisphere by means of a spiral conical motion of a sharply directed radiant beam. This motion is produced by rapidly spinning the radiating system about an axis 16 while slowly nodding the system about a second axis 17 perpendicular to and rotating with the first axis. The scanning radiator 15 is shown in simplified form to clarify the basic mechanism, but it is to be understood that other types of scanning radiators, such as one producing a fan-shaped beam rotating only in the azimuth plane, may be alternatively employed.

The particular radiator 15 illustrated employs a spherical parabolic reflector 18 attached to a supporting member 19 that is pivotally mounted between the arms of a yoke 21. A motor 22 mounted on the yoke 21 carries a disc 23 on its drive shaft. One end of a crank shaft 24 is eccentrically and rotatably connected to the disc 23 while the other end is pivotally attached to a lever arm 25 fastened to supporting member 19 at a right angle thereto. It is seen that rotation of the shaft of motor 22 may thus be made to cause a suitable oscillating or nodding motion of the reflector 18 about the nod axis 17. The yoke 21 is secured to a hollow column 26 which is in turn rotatably supported about the spin axis 16 by a base 27. A motor 28 mounted on the base 27 provides rotational motive means for the yoke 21 through pinion 29 and bevel gear 31 meshing with bevel ring gear 32 mounted on the column 26. The motor 22, of course, may be eliminated and power supplied for the nodding motion of the parabola 18 by the stationary motor 28 through suitable gearing.

The transmitter wave guide 14 is connected to a cylindrical guide 33 which enters the scanner system by passing concentrically through the hollow column 26. A rotatable joint indicated at 34 connects the cylindrical wave guide to a rectangular wave guide 35 fastened to the yoke 21. The guide 35 projects through an arm of the yoke and extends upward to the nod axis 17. A second rotatable joint indicated at 36 connects the wave guide 35 to a further cylindrical wave guide 37 supported concentrically within the member 19. A final section of rectangular wave guide 38 attached to the end of guide 37 lies on the principal axis of the reflector 18 and is adapted to interchange energy therewith by means of a deflecting plate 39. Suitable low loss rotatable wave guide joints and means for bilateral conversion from electromagnetic wave propagation in rectangular wave guides to propagation in cylindrical wave guides have been disclosed in the prior art. The high power transmitter pulses pass through the wave guide system and are emitted in a narrow club-shaped beam from the radiator 18 at a pulse repetition rate sufficiently high to insure that all objects within the field of view are irradiated during the scanning cycle.

The radiator 18 also serves to receive energy returned from objects during the intervals between successive pulse transmissions. The received energy passes in reverse direction through the wave guides associated with the scanner 15 to the junction indicated at 41 of guides 33 and 14. A wave guide 42 connects junction 41 with a receiver and detector 43.

Automatic switches known to the art as T-R and R-T boxes cooperate with wave guides 42 and 14 to disassociate the pulse transmitter 13 and the receiver 43. The R-T box 44 and the T-R box 45 are placed in parallel and series, respectively, in guides 14 and 42, respectively. These switches are of the gaseous discharge type consisting of a gas-filled resonant chamber containing electrodes held at such relative potentials as to maintain the gas close to the ionization point. These chambers are adapted to discharge when strongly excited and thus effectively damp the exciting oscillations. The boxes are positioned so that in the quiescent condition, the impedance of guide 14 is extremely high while the impedance of guide 42 is low, but in the ionized state, these conditions are reversed. Therefore, transmitted pulses, upon attempting to pass through the T-R box 45, discharge the resonant chamber and create substantially a short circuit therein which effectively blocks passage of high amplitude pulses to the receiver. The relatively low intensity received pulses fail to ionize either of the switches 44 or 45 and therefore encounter a low impedance path to the receiver 43 and a high impedance path to the transmitter 13, a condition which prevents loss of received energy in the latter.

The receiver 43 amplifies and detects the received pulses and supplies them to a video amplifier 46. Blanking pulses may be furnished from the pulse generator 12 to the receiver 43 in order to bias the same to insensitivity for the duration of the transmitted pulses and thus further insure that no transmitted energy directly affects the receiver output. The reflection signals are amplified by the video amplifier 46 and impressed through a commutator 47 on a summing amplifier and limiter 48. The output of device 48 is applied to the control grid 49 of a cathode ray indicator 51. The intensity of the electron beam and consequently the brightness of the luminous image produced on the face 52 of the tube 51 is altered in accordance with the amplitude of the received signals.

A sweep circuit, mechanically connected to the radiator 15, is adapted to convert the spiral scanning motion of the latter into corresponding beam deflecting potentials for the cathode ray indicator 51 in order that the luminous image reproduced on the tube face 52 be associated with the direction of origin of the returning signals. The sweep circuit comprises a two-phase generator 53 having a rotor winding 54 and field windings 55 and 56 bearing quadrature physical relationship to each other. The rotor winding 54 is driven synchronously with the spin motion of the radiator 15 by means of a rotor shaft 57 mounting a bevel gear 58, which latter engages the ring gear 32 fastened to the rotating column 26. The rotor winding 54 is energized by the variable output of a bridge circuit 59, which latter is formed by the series combination of equal fixed resistors 61 and 62 in parallel with a voltage divider 63. The bridge circuit 59 has a direct voltage from a source 64 applied across it. The winding 54 is connected between the common junction of resistors 62 and 61 and the sliding contact 65 of the voltage divider 63. A commutator 66 is interposed between the contact 65 and the high potential side of the winding 54. The contact 65 is oscillated in synchronism with the nodding motion of the reflector 18 by means of the shaft 67 driven from the member 19. The output voltage of the bridge 59 varies from zero when the principal axis of the reflector is parallel to the spin axis 16 to predetermined positive and negative values corresponding to the maximum nod angles in opposite directions.

The common connection of field windings 55 and 56 is grounded while leads 68 and 69 are connected to the other ends of windings 55 and 56, respectively. The voltages induced in windings 55 and 56 have a frequency equal to the rate of spin and amplitudes in accordance with the nodding motion. The modified sinusoidal potentials on leads 68 and 69 are in phase quadrature due to the spatial relationship of windings 55 and 56 and are applied through summing amplifiers 71 and 72, respectively, to vertical and horizontal deflection amplifiers 73 and 74, respectively. Amplifiers 73 and 74 connect to vertical and horizontal deflection electrodes 75 and 76, respectively, in the tube 51, where the applied potentials sweep the electron beam spirally over the face 52 in a manner corresponding to the motion of the radiated beam.

A commutator 77 is arranged to be rotated in synchronism with the spinning motion of the radiating system 15 for the purpose of introducing a directional reference indication superimposed upon the radio location information presented on the cathode ray face 52. Commutator 77 is adapted to connect a potential obtained from an adjustable voltage divider 78 to an input of the summing amplifier 48. A source 79 impresses a direct potential across the voltage divider 78. The commutator 77 is momentarily conductive as the radiant beam is swept past a reference direction, such as true north. The pulses supplied by commutator 77 occur every spin rotation and appear on the cathode ray screen as a series of substantially contiguous spots formed by the expanding and contracting sweep into a straight line which provides an electronic directional reference having an accuracy independent of the electrical characteristics of the cathode ray tube and its associated amplifying circuits.

The following means are provided for designating a particular image on the cathode ray tube for traffic control purposes. The selective visual signalling is introduced by appropriate switching circuits while the radiating system 15 is scanning near the zenith, that sector of the sky which, at most, only momentarily contains moving craft. The switches 47 and 66 are adapted to create an open circuit during this portion of the scanning cycle. A potential obtained from an adjustable voltage divider 81 is applied through a commutator 82 to the summing amplifier 48. This voltage serves as an electron beam intensifying pulse replacing the reflection signals normally derived from the video amplifier 46. This intensifying pulse is adapted to turn on the electron beam and cause a luminous spot of constant intensity to be reproduced. This spot is swept into a circle of suitable amplitude by replacing the potential supplied by the bridge 59 to the two phase generator 53 by an adjustable direct voltage obtained from a voltage divider 83 through the momentary connection of a switch 84 in parallel with the switch 66. The miniature constant brilliance circle produced on cathode ray face 52 by this switching operation is positioned to surround any luminous image to which it is desired to call attention. The positioning potentals are derived for ease in radio transmission, as will become apparent as the description proceeds, from adjustable frequency audio oscillators 85 and 86.

The waves generated by oscillators 85 and 86 are applied through a commutator 87 only while the signalling circle is being produced. The intermittently transmitted waves are applied to band-pass filters 88 and 89. Filter 88 is adapted to pass frequencies generated by oscillator 85 while attenuating frequencies created by oscillator 86, whereas filter 89 conversely transmits the waves generated by oscillator 86 while attenuating frequencies from the oscillator 85. Discriminators 91 and 92 supplied by filters 88 and 89, respectively, are tuned to the middle of the frequency bands generated by oscillators 85 and 86, respectively.

Balanced rectifiers 93 and 94 are fed by discriminators 91 and 92, respectively. The output voltages of these rectifiers are either positive, zero, or negative in accordance with whether the tuning controls of oscillators 85 and 86 are adjusted below the mean frequencies of the discriminators 91 and 92, respectively, coincident with these frequencies, or above them. Balanced rectifiers 93 and 94 apply their direct potentials to tube 51 through sum circuits 72 and 71, respectively, and deflection amplifiers 74 and 73, respectively. Thus the adjustment of the tuning controls of oscillators 85 and 86 results in the application of suitable positioning potentials to the cathode ray indicator 51 for the period during which the reference circle is produced.

Figure 2:
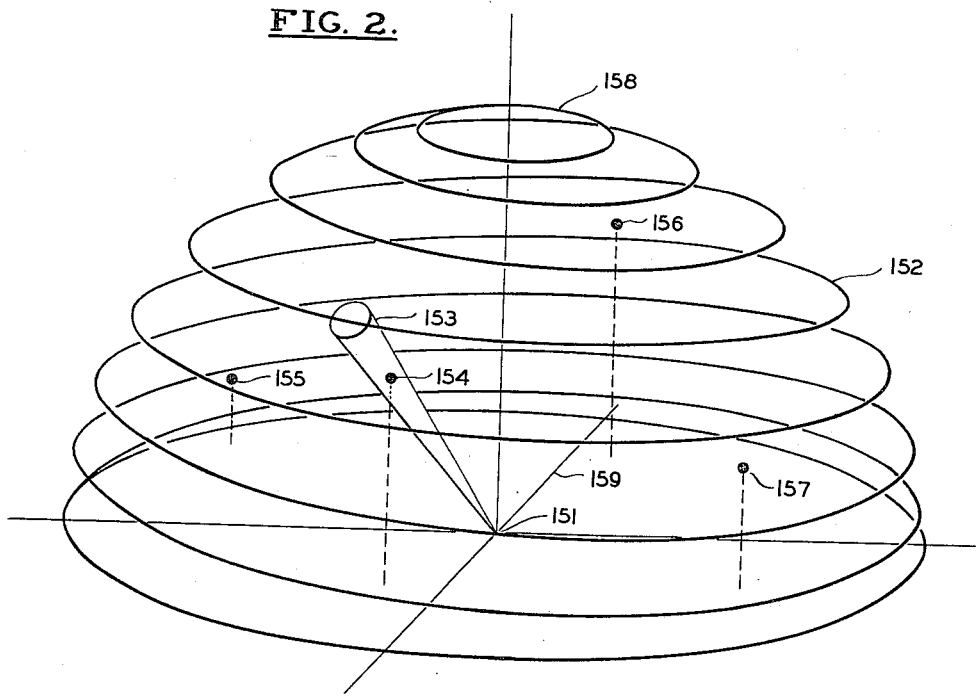
Fig. 2 is an idealized perspective representation of the field of view scanned by the radio location apparatus employed in the illustrated embodiment of the present invention.

The manner in which the radio location apparatus analyzes the surrounding space with the scanning radiant beam is clarified by reference to Fig. 2. The reference viewpoint 151 is shown at the center of a hemisphere formed by a spiral 152 representing the path of a radiant beam 153 issuing from the viewpoint 151. Dots 154, 155, 156, and 157 symbolize aircraft which are scanned by the beam 153 and reflect energy back to the viewpoint 151. Reference numeral 158 indicates the sector of the sky scanned while the signalling circle is being generated. Line 159 is the reference direction upon passing which the directional reference pulse is produced.

Figure 3:
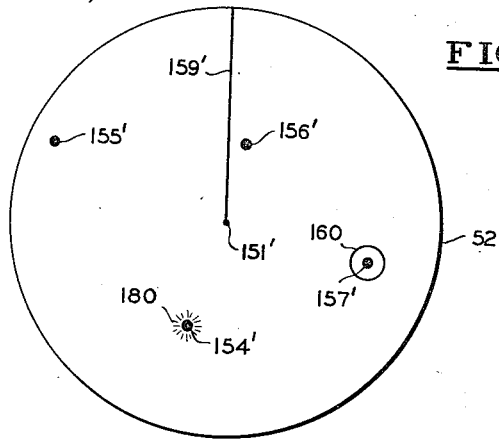
Fig. 3 is an idealized drawing of a typical cathode ray indication provided by the illustrated apparatus.

The positional data derived from the viewpoint 151 is pictorially presented on the face 52 of the indicator 51 substantially as shown in Fig. 3. Spots 154', 155', 156', and 157' represent luminous images corresponding to the objects 154, 155, 156, and 157, respectively. The reference direction 159 is reproduced as the line 159'. A selective signalling circle 160 is positioned to call the attention of an observer on the craft 157.

Figure 4:
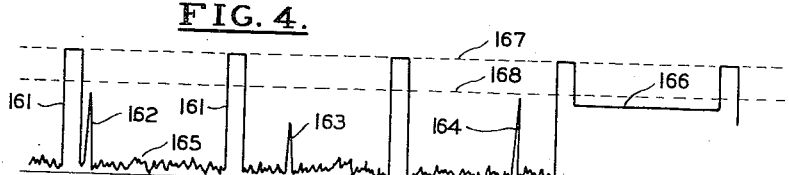
Fig. 4 is a graph showing a possible wave shape of the signals transmitted to the mobile craft.

The radio location information derived by the above-discussed apparatus is broadcast to mobile craft in the neighborhood by means of a television-type of radio channel. The reflection signals, directional reference pulses, and signalling circle intensifying pulses are supplied to a video amplifier 95. This composite wave is shown in Fig. 4 where pulses 161 are the directional reference or spin synchronizing waves. Sharp pulses 162, 163, and 164 represent reflection signals from objects in the path of the scanning beam. Background noise voltages are indicated by reference numeral 165. A portion of the relatively long duration signalling circle intensifying squarewave appears at 166. A dashed line 167 represents the limiting level of the sum circuit and limiter 48. This limiting is necessary to prevent excessive amplitude of the pulses 161 when pulse 166 is introduced. Amplifier 95 raises the signal level sufficiently so that its amplified output may be employed in a modulated radio frequency amplifier 97, where the video signals amplitude modulate a carrier frequency derived from a picture carrier source 96. The output of the modulated amplifier 97 is radiated from a suitable antenna symbolized at the reference numeral 98.

The adjustable frequency waves from oscillators 85 and 86 are applied to an audio amplifier 99. Amplifier 99 supplies the signal input to modulated radio frequency amplifier 101 which obtains a suitable sound carrier frequency from the sound carrier source 100.

Oral instructions from the traffic control officer also modulate the sound carrier frequency by means of a microphone 102 which supplies speech frequencies to a selective speech amplifier 103 whose output is connected to the audio amplifier 99. A measure of the amplitude of the spiral sweep is broadcast over the sound channel by modulating a constant sub-carrier frequency generated by an audio oscillator 104 and introduced to a modulator 105 with the direct potential supplied to the rotor winding 54. The constant frequency variable amplitude output of modulator 105 is fed to the audio amplifier 99. Thus, the sound channel contains information characterizing the sweep and circle amplitude in the form of a low frequency wave lying below the normal voice frequencies. The voice frequencies are constrained by the frequency discriminating characteristics of speech amplifier 103 to occupy a range of a few thousand cycles while the horizontal and vertical circle displacement voltages are characterized by frequencies lying within distinct bands above the important speech frequencies.

Referring now to Fig. 1B, receiving apparatus is shown for reproducing the information obtained by the radio location apparatus situated on the ground and broadcast to mobile craft. A television receiver 106 is adapted to receive the radiations of both the picture and sound transmitters shown in Fig. 1A. A local oscillator 107 supplies a mixer 108 with a heterodyning frequency spaced a convenient intermediate frequency from the combined picture and sound channels picked up by an antenna 109. Selective intermediate frequency amplifiers 111 and 112 separate the picture and sound channels, respectively. Detectors 113 and 114 reproduce video signals and speech and synchronizing frequencies from amplifiers 111 and 112 respectively.

A video amplifier 115 raises the level of the video signals and applies them to a sum circuit 116, which, in turn, impresses the signals on control grid 117 of a cathode ray indicator 118. The output from video amplifier 115 is also supplied over a lead 120 to a clipper circuit 119 which is adapted to respond only to the directional reference pulses 161 which are shown in Fig. 4 and occur once each spin cycle of the scanning radiator 15. The clipper 119 amplifies only those voltages that appear above the clipping level 168 indicated in Fig. 4. These directional reference or synchronizing pulses are applied to a frequency control input of a sweep generator 121 which may take the form of a familiar multivibrator. The output of the multivibrator is smoothed into a substantially sinusoidal wave and applied to the parallel inputs of a balanced modulator 122. The amplitude of the synchronized sweep frequency is modified according to the momentary amplitude of the spiral sweep employed in the radio location apparatus by selecting the sub-carrier frequency in the sound channel containing this information, and determining its amplitude by rectification. An audio amplifier 123 amplifies the output waves of the detector 114, and a low pass filter 124 selects the frequency whose amplitude characterizes the spiral scan amplitude. The output of filter 124 upon rectification in rectifier 125 is suitable for modifying the sweep voltage in the modulator 122. The modified sweep frequency is supplied by the modulator 122 directly to a sum circuit 126 and through a 90° phase shifter 127 to a similar sum circuit 128. The sum circuits 126 and 128 are connected through amplifiers 129 and 131, respectively, to a magnetic deflection yoke 132.

The deflection yoke 132 is rotatably mounted concentric with the longitudinal axis of the tube 118, and the deflection potentials are introduced to the yoke through slip rings 133. A ring gear 171 is attached to the yoke and slip ring assembly. The gear 171 meshes with a pinion 172 mounted on the rotor shaft 173 of a self synchronous receiver 174. The receiver 174 is responsive to a self synchronous transmitter 176, the rotor of which is mounted on the azimuth axis 177 of a directional gyroscope 178 and angularly positioned thereby. An isolation amplifier 175 is interposed between self synchronous devices 174 and 176 to act as a torque amplifier and avoid placing a load on the gyroscope 178. These means permit the pattern reproduced on the tube 118 to be always aligned with the reference direction irrespective of heading of the craft.

The signalling circle placement potentials are derived from the output of the audio amplifier 123 in a manner very similar to that employed at the ground station. A portion of the amplified audio frequencies is applied to a limiter 134 which eliminates substantially all amplitude modulation of the audio frequencies. The output of limiter 134 is applied to band-pass filters 135 and 136 similar to filters 88 and 89 at the ground station. These filters feed discriminators 137 and 138, respectively, corresponding to devices 91 and 92 in Fig. 1A. Discriminators 137 and 138 feed balanced rectifiers 139 and 141, respectively. The output potentials of devices 139 and 141 are proportional to the outputs of balanced rectifiers 93 and 94 employed in the ground apparatus. These positioning potentials are added to the sweep voltages in sum circuits 126 and 128 with the result that when the circle intensification pulse is applied to the cathode ray grid 117 and a circle-defining sweep is provided by the modulator 122, the direct voltages from rectifiers 139 and 141 position the selective signalling circle on the face of tube 118 in a manner corresponding to the positioning of the circle on the face 52 of the cathode ray tube 51. Thus the signalling marks on the navigational pictures provided on the mobile craft are positioned at the will of the traffic control officer by adjusting the tuning controls of oscillators 85 and 86.

The voice frequencies are reproduced at the craft by selecting those frequencies which are amplified by the speech amplifier 103 in the ground apparatus by means of a band-pass filter 142 interposed between the audio amplifier 123 and an adjustable gain amplifier 143. Earphones 144 attached to the amplifier 143 symbolize the means for converting between electrical and sound waves.

The cathode ray indication on the mobile craft is seen to correspond accurately to the indication available on the ground. However, this indication is of only moderate utility to an observer on the craft because when there are a plurality of craft occupying the same general area, there is grave danger of confusing the image corresponding to the craft carrying the receiving equipment with other craft. Means are provided to overcome this trouble by particularly characterizing the spot corresponding to the craft carrying the observer thereby eliminating all possible ambiguity.

An ultra high frequency pulse receiver 145 mounted on the craft responds to the scanning radiant beam as it sweeps past the craft. The radio location apparatus on the ground substantially simultaneously obtains reflection signals from the craft which signals are broadcast back to the craft and appear as a luminous image on the indicator 118. The output pulse from receiver 145 is added in the sum circuit 116 to the video pulses obtained from the picture channel and an intensification of the beam results when the same is deflected to the position corresponding to the image of the craft carrying the indicator. The sensitivity of the pulse receiver 145 may be very low, since the intensity of the radiant beam is attenuated only in inverse proportion to the distance between the radio location apparatus and the craft. The transmitter power, on the other hand must be sufficient to allow for a loss inversely as the square of this distance and still provide an adequate signal at the location apparatus after reflection from the craft. The identification of the correct image on the cathode ray screen may, of course, be accomplished by defocusing the electron beam or otherwise altering the image shape. It is also evident that the pulses obtained from the passage of the radiant beam derived from the picture channel need not exactly coincide in time, since the two pulses will have a cumulative effect on the fluorescent screen. Even if the video signal from the picture channel is extremely weak, a gain control 146 in the pulse receiver 145 may be adjusted to give a desired contrast between the spot corresponding to the true aircraft and the images of neighboring craft.

The beneficial results of this own spot intensification may be visualized by reference to Fig. 3. If for the moment it is assumed that the cathode ray tube face 52 belongs to an indicator mounted on the craft 154 rather than situated at the ground station 151, then spot 154' is observed to be more brilliant than other spots. The greater brightness of spot 154' is symbolized by a halo 160 surrounding it and distinguishing it from other images. It is evident that an observer on craft 154 can immediately grasp his spatial relationship to other craft and to the reference position indicated at 151'.

Novel advantages of the present invention are derived from the ability of an observer to identify the image of his own craft from among a plurality of images. This permits the employment of but a single centrally located collector of obstacle and navigational information which serves the needs of all craft within the field of view. Since there are many possible changes and variations in the above system and many apparently widely different embodiments of this basic conception, it is intended that all matter contained in the above description or shown in the accompanying drawings shall be considered as illustrative and only limited in scope by the appended claims.

What is claimed is:

1. A radio navigation system comprising object detecting and locating means, including means for scanning a plurality of mobile craft with a radiant beam to determine positional data thereof with respect to a reference position, means associated with said object detecting means for transmitting into space said positional data, means carried by at least one of said craft for receiving and reproducing said positional data, and means on said one of said craft for particularly characterizing the positional data of said one of said craft.

2. A radio navigation system comprising object detecting and locating means, including means for scanning a plurality of mobile craft with a radiant beam to determine positional data thereof with respect to a reference position, television means associated with said object detecting means for transmitting into space said positional data, means carried by at least one of said craft for receiving and reproducing said positional data, and means on said one of said craft actuated by said scanning radiant beam for particularly characterizing the positional data of said one of said craft.

3. A method of finding the direction of a reference position from a mobile craft comprising the steps of radiating a beam of electromagnetic energy from said reference position, scanning a field of view including said craft with said beam, receiving at said reference position energy intercepted and reflected by said craft, and transmitting to said craft signals defining the instantaneous direction of said beam upon receiving said reflected energy at said reference position.

4. A radio navigation system comprising object detecting and locating means for deriving signals defining the locations of a plurality of mobile craft with respect to a known location, control means for generating signals distinguishing one of said locations, television means associated with said locating and control means for transmitting said signals into space, and means on said craft for receiving said signals and reproducing said locations.

5. A method of locating obstacles from a mobile craft comprising the steps of generating radio waves, sweeping said waves over a field of view including said craft, receiving waves returned from obstacles in the path of said waves, radiating signals to said craft in accordance with the character of said received waves, receiving said signals on said craft, forming a representation of said field of view from said signals, and particularly characterizing that portion of said field of view occupied by said waves when impinging on said craft.

6. An obstacle locating radio system for a mobile craft comprising means for radiating a beam of radio waves, means for scanning said beam over a field of view including said craft, means for receiving waves reflected from obstacles in the path of said beam, television means for radiating signals to said craft in accordance with the character of said reflected waves and the direction of said beam, and means mountable on said craft including a receiver for receiving said signals, an indicator for forming a representation of said field of view from said signals, and means responsive to said beam for identifying the direction of said craft in said representation of said field of view.

7. A radio navigation system comprising object detecting and locating means having means for scanning a radiant energy beam over a field of view including a mobile craft to determine positional data thereof with respect to a reference position, television means responsive to said object detecting means for transmitting signals into space in accordance with said positional data, and means mountable on said craft for receiving said signals and reproducing said positional data.

8. A radio navigation system comprising object detecting and locating means having means for scanning a radiant energy beam over a field of view including a mobile craft to determine positional data thereof with respect to a reference position, television means responsive to said object detecting means for transmitting signals into space in accordance with said positional data, means mountable on said craft for receiving said signals and reproducing said positional data, and means on said craft responsive to said beam for particularly characterizing the positional data of said craft.

9. A radio navigation system comprising object detecting and locating means having means for scanning a radiant energy beam over a field of view including a mobile craft to determine the direction thereof from a reference position, means responsive to said object detecting means for transmitting signals into space in accordance with said direction, means mountable on said craft for receiving said signals and indicating said direction, and means on said craft responsive to said beam for identifying said directional indication of said craft.

10. An obstacle locating radio system for a mobile craft comprising means for radiating a beam of radio waves, means for sweeping said beam over a field of view including said craft, means for receiving waves reflected from obstacles in the path of said beam, a transmitter for radiating signals to said craft according to the character of said reflected waves and the direction of said beam, and means mountable on said craft including a receiver for receiving said signals, an indicator for forming images of said obstacles from said signals, and means responsive to said beam for identifying the image corresponding to said craft.

11. An obstacle locating radio system for a mobile craft comprising means for radiating a beam of radio waves, means for sweeping said beam over a field of view including said craft, means for receiving waves returned from obstacles in the path of said beam, a transmitter for broadcasting signals in accordance with the character of said returned waves and the direction of said beam, and means mountable on said craft including a receiver for receiving said signals, an indicator for forming images of said obstacles from said signals, and means responsive to said beam for identifying the image on said indicator corresponding to said craft.

12. An obstacle locating radio system for a craft comprising means for generating radio waves, means for sweeping a radiation pattern of said waves over a field of view including said craft, means for receiving waves from obstacles in response to said radiation pattern, a transmitter for broadcasting signals in accordance with the character of the received waves, and means mountable on said craft including means for receiving said signals, an indicator for forming images of said obstacles from said signals, and means responsive to said radiation pattern for identifying the image on said indicator corresponding to said craft.

13. A radio navigation system comprising object detecting and locating means for scanning a plurality of mobile craft with a radio beam to determine the directional data thereof with respect to a reference position, television means associated with said object detecting means for broadcasting said data, means carried by at least one of said craft for receiving and reproducing said data, and means on said one of said craft for correlating the passage of said radio beam across said craft with the reproduction of the directional data associated with said craft.

14. In a radio navigation system wherein radio waves are generated, swept over a field of view including a mobile craft, received upon reflection from obstacles in the path of said waves, and signals are broadcast into space in accordance with the character of the received waves, the method steps of receiving said signals at said craft, forming a representation of said field of view derived from said signals, and distinguishing the indication of said craft from others in the representation of the field of view by modifying the indication corresponding to said craft in response to waves impinging on said craft.

15. In a radio system wherein object detecting and locating means is adapted to scan a plurality of mobile craft with a radiant beam to determine their directions with respect to a reference position and a transmitter is associated with said object detecting means for broadcasting signals into space characterizing said directions, apparatus mountable on a mobile craft for receiving said signals and reproducing said directions, and receiver means on said craft responsive to the radiant scanning beam for correlating the passage of said radiant beam across said craft with the reproduction of the direction corresponding to said craft.

16. In a radio navigation system wherein an object locator employs a radio beam to determine information concerning the presence and direction of obstacles in the path of said beam and signals containing this information are broadcast into space, the apparatus comprising a receiver mountable on a mobile craft for receiving said broadcast signals, an indicator for reproducing said information from said signals, and receiver means responsive to the radiant scanning beam when it impinges on said craft for modifying the directional information corresponding to the craft adapted to mount said apparatus.

FREDERIC A. JENKS.

REFERENCES CITED

The following references are of record in the file of this patent:

UNITED STATES PATENTS

| Number | Name | Date |
|---|---|---|
| 1,854,066 | Robinson | Apr. 12, 1932 |
| 2,027,530 | Hammond | Jan. 14, 1936 |
| 2,252,083 | Luck | Aug. 12, 1941 |
| 2,257,320 | Williams | Sept. 30, 1941 |
| 2,267,715 | Bowen | Dec. 30, 1941 |
| 2,284,873 | Kemp | June 2, 1942 |
| 2,293,899 | Hanson | Aug. 25, 1942 |
| 2,307,029 | Elm | Jan. 5, 1943 |
| 2,412,669 | Bedford | Dec. 17, 1946 |

FOREIGN PATENTS

| Number | Country | Date |
|---|---|---|
| 317,826 | Great Britain | May 29, 1930 |